(12) United States Patent
Fougeroux et al.

(10) Patent No.: US 7,093,096 B2
(45) Date of Patent: *Aug. 15, 2006

(54) OPTIMISED MANAGEMENT METHOD FOR ALLOCATING MEMORY WORKSPACE OF AN ONBOARD SYSTEM AND CORRESPONDING ONBOARD SYSTEM

(75) Inventors: Nicolas Fougeroux, Le Chesnay (FR); Olivier Landier, Paris (FR); Patrice Hameau, Boulogne Billancourt (FR)

(73) Assignee: CP8Technologies, Louveciennes (FR)

( * ) Notice: Subject to any disclaimer, the term of this patent is extended or adjusted under 35 U.S.C. 154(b) by 95 days.

This patent is subject to a terminal disclaimer.

(21) Appl. No.: 10/472,323

(22) PCT Filed: Dec. 20, 2001

(86) PCT No.: PCT/FR01/04122

§ 371 (c)(1),
(2), (4) Date: Sep. 18, 2003

(87) PCT Pub. No.: WO02/50688

PCT Pub. Date: Jun. 27, 2002

(65) Prior Publication Data

US 2004/0098554 A1    May 20, 2004

(30) Foreign Application Priority Data

Dec. 21, 2000   (FR)   ................................. 00 16725

(51) Int. Cl.
*G06F 12/02* (2006.01)

(52) U.S. Cl. .................................. 711/170; 711/173
(58) Field of Classification Search ................ 711/170, 711/173
See application file for complete search history.

(56) References Cited

U.S. PATENT DOCUMENTS

| | | | | |
|---|---|---|---|---|
| 3,924,245 | A | * | 12/1975 | Eaton et al. ................. 711/219 |
| 4,044,334 | A | * | 8/1977 | Bachman et al. ........... 707/102 |
| 5,946,714 | A | * | 8/1999 | Miyauchi ..................... 711/205 |
| 6,226,728 | B1 | * | 5/2001 | See et al. .................... 711/171 |
| 6,363,467 | B1 | * | 3/2002 | Weeks ......................... 711/170 |
| 6,546,477 | B1 | * | 4/2003 | Russo et al. ................ 711/170 |
| 2004/0215913 | A1 | * | 10/2004 | Fougeroux et al. ......... 711/170 |
| 2004/0250041 | A1 | * | 12/2004 | Sollich ........................ 711/170 |

* cited by examiner

Primary Examiner—B. James Peikari
(74) Attorney, Agent, or Firm—Pehr Jansson

(57) ABSTRACT

This invention concerns an optimised management method for allocating memory space of an onboard system to a data structure and a corresponding onboard system. The object code packets and the data packets being discriminated, and the memory being subdivided into addressable elementary memory blocks, the method consists in allocating ($A_1$) to the object code packets a set of elementary memory blocks located in a first memory space ($MS_1$) to addresses substantially adjacent and to the data packets another set of elementary memory blocks located in a second memory range ($MS_2$). This enables to avoid fragmentation of the memory zone, during successive installations/deinstallations and to implement very easily an optimal defragmentation procedure, adapted to each type of data, code or application data.

8 Claims, 5 Drawing Sheets

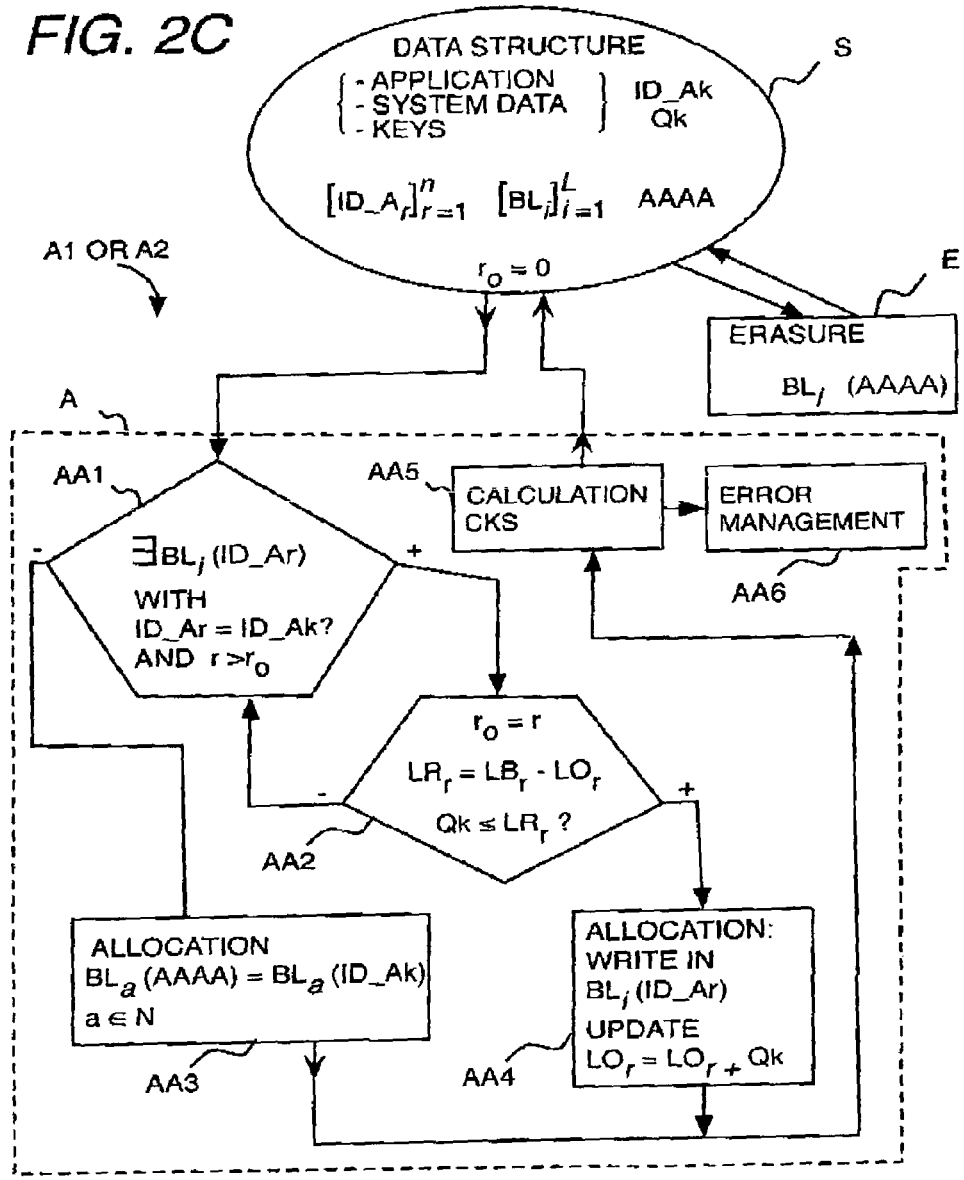

OPTIMISED MANAGEMENT METHOD FOR ALLOCATING MEMORY WORKSPACE OF AN ONBOARD SYSTEM AND CORRESPONDING ONBOARD SYSTEM

FIELD OF THE INVENTION

This invention relates to an optimised management method for memory allocation of an onboard computer system, called onboard system, and the corresponding onboard system.

BACKGROUND OF THE INVENTION

The onboard systems now available on the market, such as in particular the digital assistants, microprocessor or micro-controller cards, cards of the PCMCIA type, portable data processing units, also called "notebook" or "sub-notebook", have as common characteristics, often contradictory, the reduction of their size and footprint and the increase in their functionality, using, in particular, the continuous progress in the computation power of microprocessors or micro-controllers onboard in them.

Due to the above-mentioned evolution, the onboard systems tend to reproduce in the most possible faithful manner any microcomputer functionality, except however the functionalities offered by a possible connection of equipment or items peripheral to them.

Among one of the types of the functional mode of onboard systems likely to limit the reconciliation of their functionalities with those of micro-computers, the one relating to the management mode of the available memory space seems critical, because, for the time being, such a management mode seems reduced to the minimum.

Indeed, if the onboard system is made of a card with a microprocessor, also called chip card, as shown on FIG. 1, this onboard system marked 10 comprises classically some input/output circuits I/O, marked 12, information processing resources, marked 14, made of a micro-controller and connected to the input/output circuits 12. Further, a non-volatile memory 18 is provided, which consists of a programmable memory 18a and a ROM memory, or a memory with reading access only 18b. Finally, a working memory RAM marked 16 is also provided. These memories are connected to the micro-controller or microprocessor 14 via a BUS link. The whole is managed by an operating system OS, which can be onboard in the non-volatile memory 18. Finally, in some cases, the microprocessor card may have a CRYPTO calculation unit SI, marked 20, itself connected to the microprocessor 14, and acting, somehow, as a dedicated co-processor.

The microprocessor itself may be replaced or completed by logical circuits onboard in a semiconductor chip, such logical circuits being possibly ASCI-type circuits (Application Specific Integrated Circuits).

Management of the memory field is classically executed, for installing for instance multiple applications, by a reference made of a pointer, linking a starting address with an end of memory field address relating to an application.

When executing these applications, packs of data relating to such applications are written at any address in this memory field, the only criterion for memory allocation and for writing being a criterion of free memory field sufficient between a beginning pointer and an end pointer, to allow memorising a pack of data of a known size.

With successive applications installation/de-installation procedures in the corresponding memory field, free memory field spaces are created in which object code packs, or data, may be written and memorised.

Such an operation process leads to a breaking-up phenomenon, also called fragmentation, for the memory field considered.

The above mentioned breaking up or fragmentation has, just as in case of fragmentation of the hard disk memory field in microcomputers, grave inconveniences, such as the slowing down of considered applications or programmes execution, and the non optimised use of the memory field for the onboard system.

This invention has the aim of remedy the above mentioned inconveniences in onboard systems of the previous art.

SUMMARY OF THE INVENTION

Consequently, an aim of this invention is to implement an optimised management method for the dynamic storage allocation to a data structure or an identified application using an identification number and memorised in the form of digital information packs in the memory field of an onboard system, by which process the elementary memory field is subdivided into elementary memory blocks organised according to an addressable network.

Another aim of this invention is therefore to implement an optimised management method for the dynamic storage allocation in an onboard system in which, with the storage field being divided into elementary storage blocks, and the allocated block elementary blocks rearrangement process, the breaking up or fragmentation phenomenon of the storage field of the onboard system is mostly eliminated.

Another aim of this invention is therefore the implementation of an optimised management method for the dynamic storage allocation in an onboard system in which a process of defragmentation of its memory field enables a near elimination of any breaking up phenomenon further to deletion of an application.

The optimised management method for the dynamic storage allocation to a data structure identified by a digital identification number in the memory field of an onboard system, the subject of this invention, is implemented starting from information packs made of object code packs representing this data structure and data packs related to such data structure, with the memory field being subdivided into addressable elementary memory blocks.

It consists in allocating to the object code packs a set of elementary memory blocks situated in addresses almost contiguous in a first memory range dedicated to the memory allocation of object code packs of this storage field and to allocate to the data packs another set of elementary memory blocks in a second memory range dedicated to the memory allocation of data packs for this memory field. This enables avoidance of the breaking up of the first and second dedicated ranges, during successive installations/deinstallations of data structures.

The optimised management method for the storage dynamic allocation, the subject of this invention, applies to any onboard system, but more particularly to microprocessor or micro-controller cards with several applications.

BRIEF DESCRIPTION OF THE DRAWINGS

The optimised management method for the memory dynamic allocation of an onboard system and the corresponding onboard system will be better understood when reading the description and the comments on the drawings hereafter, where, apart from FIG. 1 concerning an onboard system, such as a chip card in prior art:

FIG. 2c shows, for illustration, a functional organisation chart of a particular operation mode that is not limited for the allocation of elementary memory blocks allowing the implementation of the management method for the memory allocation of an onboard system, the subject of this invention;

DETAILED DESCRIPTION

A more detailed description of the optimised management method for the dynamic storage allocation to a data structure, the subject of this invention, will now be given in connection with FIG. 2a and the following figures.

Figure 2A:
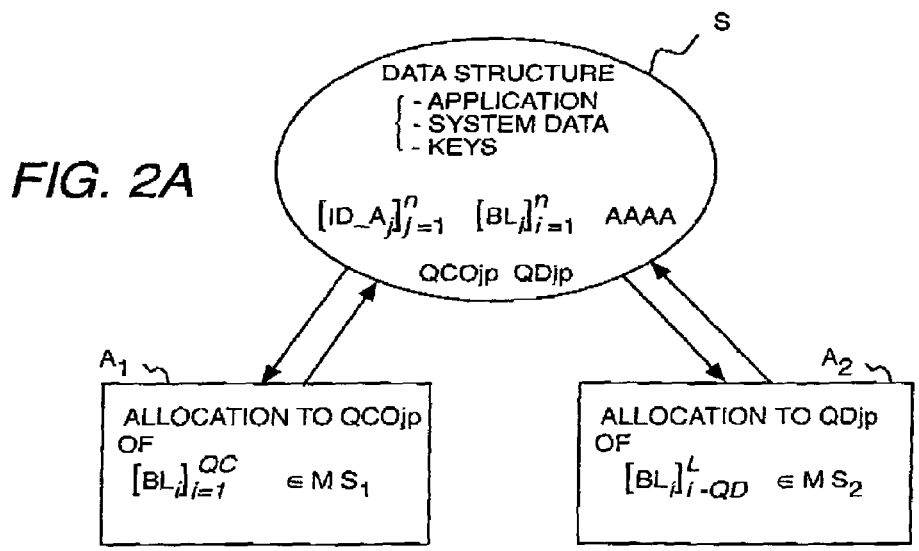
FIG. 2a shows a functional organisation chart illustrating the steps enabling the implementation of the optimised management for memory allocation of an onboard system, the subject of this invention, during the installation of an application.

FIG. 2a shows a functional organisation chart for the main steps, enabling the implementation of the optimised management method for dynamic memory allocation to a data structure in an onboard system, according to this invention, when installing an application, this functional organisation chart being related actually to a status diagram of the above mentioned main steps.

Figure 1:
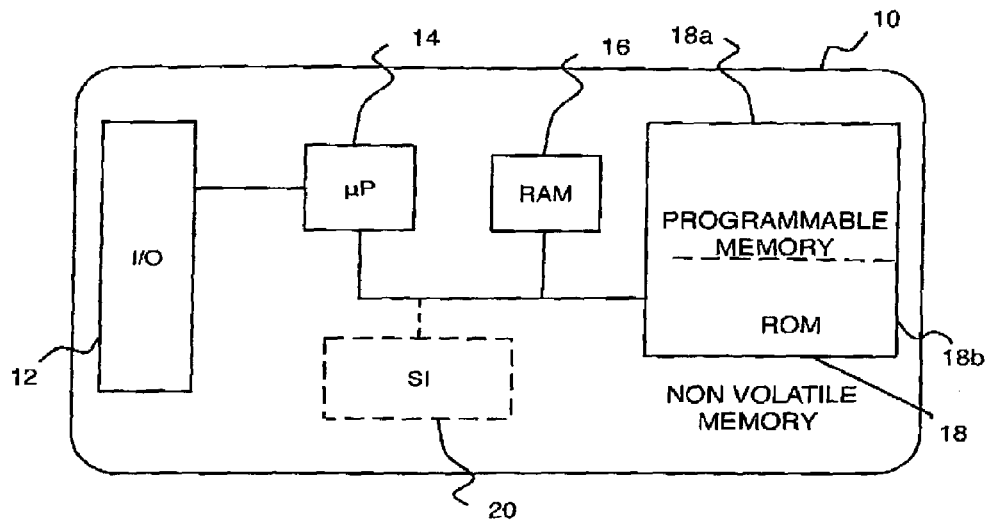

In particular, it is understood that the S step shown on FIG. 2a relates to a starting status in which a data structure, made by an application, by system data, or eventually by specific keys or digital values, should be stored, i.e. installed for applications for instance in the storage field of the onboard system for which the structure is that previously described in the description connected with FIG. 1.

In particular, it is understood that each data structure may be favourably identified by an identification number, marked $ID\_A_j$, where j may have values between 1 and n, with n being the total number of data structures likely to be stored in the above mentioned memory space.

Further, for implementing the process subject of this invention, it is indicated that the memory space managed in an optimised manner according to it is divided into elementary memory blocks, each elementary memory block, marked $BL_i$ with i possibly between i=1 and i=L, being made by a fixed number of bytes.

In a preferred non limited embodiment mode, it is indicated that the number of bytes making each $BL_i$ block may be a power of 2, in order to facilitate the addressing of each elementary memory block as well as the addressing in each elementary memory block so defined.

In a mode of embodiment given as a non limiting example, it is indicated that each elementary memory block may include 256 bytes.

Finally, and within the implementation of the process subject of this invention, there is available at the S starting step an arbitrary digital value, marked AAAA, which may be used at an advantage in order to allow the implementation of a memory dynamic allocation process in elementary specific memory blocks, more especially adapted to the process implementation of optimised management for the dynamic memory allocation, the subject of this invention, as will be described later in the description.

In FIG. 2a, at the above mentioned starting S step, it should be noted:

$[ID\_A_j]_{j=1}^n$ the whole of identification numbers of data structures likely to be installed and managed according to the optimised management protocol for memory allocation, the subject of this invention;

$[BL_i]_{i=1}^L$ the whole of elementary memory blocks available further to a subdivision of the onboard system memory area as above mentioned;

$QCO_{jp}$ any object code pack relating to a data structure or identification number application $ID\_A_j$ during the installation procedure for the considered application;

$QD_{jp}$ Any data pack relating to the data structure or application of the same identification number $ID\_A_j$ during installation.

Generally, it is indicated that, during installation of a data structure or an application, the information packs are made of object code packs as mentioned above, representing this data structure, and of data packs relating to this data structure or the considered application.

This subdivision into information packs of the two above mentioned classes is the result of an actual discrimination of these information packs according to the installation step carried out. It is understood in particular that during installation of the object code representing the data structure or the application, the related information packs are known as such. The same applies to data packs relating to this data structure or application. Thus, the above mentioned subdivision is a result, basically, from the installation process for each application in the memory area of the related onboard system.

Due to the subdivision of the above mentioned memory area into elementary memory blocks that are addressable and the actual discrimination, and therefore the information packs subdivision into object code packs and into data packs related to this data structure, the optimised management method for dynamic memory allocation to a data structure, the subject of this invention, consists of an $A_1$ step, as shown on FIG. 2a, to be allocated to object code packs $QCO_{jp}$ for the application or the related data structure, a set of elementary memory blocks, marked $[BL_i]_{i=1}^{QC}$, these elementary memory blocks being situated at almost close-by addresses in a first memory range dedicated to the memory allocation of object code packs of the considered memory area.

In FIG. 2a, the allocation process, at the $A_1$ step, to the object code packs is marked:

$$[BL_i]_{i=1}^{QC} \in MS_1$$

In the previous relation, it is indicated that $MS_1$ designates the first memory range dedicated to the memory allocation of the above mentioned object code packs. Also, and in a non limiting manner, the whole of elementary memory blocks situated at almost neighbouring addresses in the first dedicated memory range is said to be defined by the starting address i=1 and by the arrival address QC, with QC being actually the necessary memory range in the number of elementary memory blocks to ensure the storage of all the information packs of the object code $QCO_{jp}$ for the data structure or related application.

Also, the optimised management method for the dynamic allocation of memory to a data structure, the subject of this invention, consists of, in a $A_2$ step, allocating to the data packs $QD_{jp}$ another set of elementary memory blocks, marked $[BL_i]_{L-QD}{}^L$ in a second memory range dedicated to the data pack memory allocation for the considered memory range.

In FIG. 2a, at step $A_2$, the corresponding allocation operation is marked according to the formula:

$$[BL_i]_{L-QD}^L \in MS_2$$

Regarding the whole of elementary memory blocks in the second memory range dedicated to the data pack memory allocation, the starting address is established in a non-limiting way on the value L-QD where QD is actually the memory range required to store the whole of data packs $QD_{jp}$ for the application or the corresponding data structure.

Regarding the starting and finishing addresses for the definition of elementary memory blocks sets above mentioned in step $A_1$ or respectively $A_2$, these data may be arbitrary, as long as there is no risk of recuperation regarding the above-mentioned sets.

Figure 2B:
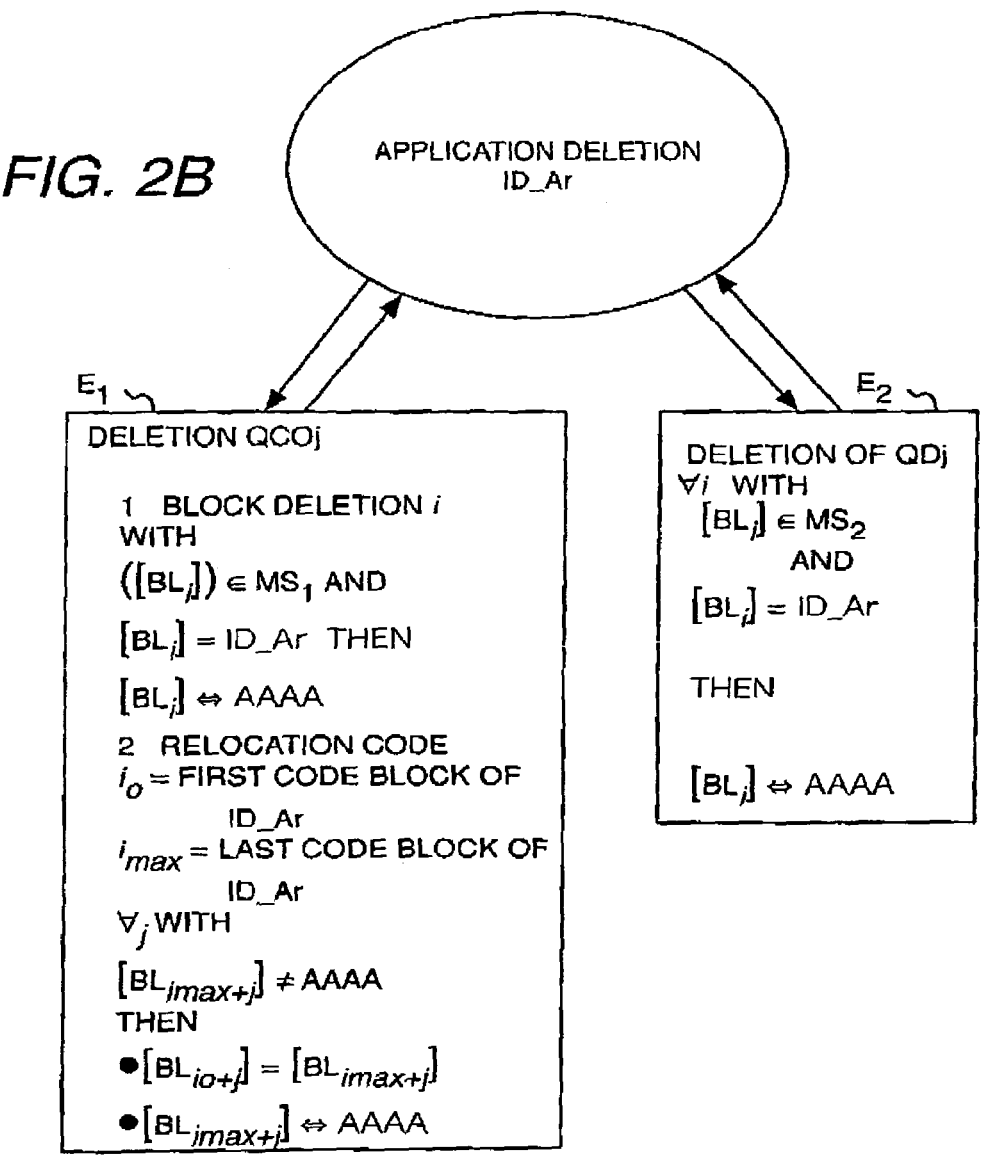
FIG. 2b shows, for illustration, an organisation chart representing the detail of process implementation steps for the memory allocation optimised management of an onboard system, the subject of this invention, during a deletion of an application.

Also, as shown in FIG. 2b, for a deletion operation E of code packs $QCO_j$, or respectively the data packs $QD_1$ above mentioned, the management method for allocating memory, the subject of this invention, may consist, as shown in the above mentioned figure, starting from a deletion step of an application ID_Ar, for deletion of object code packs $QCO_j$ of a step E1, of a deletion sub-step for blocks with index i, this sub-step marked $E_{11}$, being designated on FIG. 2b with the formula:

$E_{11}$ $([BL_i]) \in MS_1$ and $[BL_i] = ID_{-Ar}$ then $[BL_1]$ AAAA.

With this deletion operation, it is understood that, for any block subject to deletion, block $BL_i$ belonging to the storage area for object code packs $MS_1$, the whole of these blocks corresponding to the application subject to deletion, and therefore to the referenced application ID_Ar, then each of the above mentioned blocks $BL_i$ is allocated the specific AAAA reference previously mentioned in the description.

The sub-step 1 for deletion is then followed with a sub-step 2 of code relocation $E_{12}$. This rearrangement by translation is made for $i_o$ designating the first code block for the referenced application ID_Ar and $i_{max}$ the last code block in this same application subject to deletion.

The relocation is then made on each block with an index $i_{max+j}$ for which the reference number is different from AAAA, this operation being marked on FIG. 2b:

$[BL_{i0+j}] = [BL_{imax+j}]$ $[BL_{imax+j}] \Leftrightarrow$ AAAA.

The previous relocation actually consists of achieving a translation for the blocks with an index $i_{max}+j$ towards the blocks with an index $i_o+j$ followed by a deletion via an attribution of the identification value AAAA of the moved blocks.

Regarding the deletion of data packs $QD_j$, a deletion step $E_2$ is shown on FIG. 2b, this being marked, for any i index on blocks $BL_i$, by $[BL_i] \in MS_7$ and $[BL_i] = ID$ Ar then $[BL_i] \Leftrightarrow$ AAAA.

It is thus understood that in any $BL_i$ block related to data packs $QD_j$ the identification value AAAA is then given as above mentioned in the description, which allows the deletion of data packs related to the above-mentioned block.

It is seen in particular that, for removing the data packs $QD_j$, it is not necessary to relocate the removed blocks.

Regarding the optimised management method implementation for the memory dynamic allocation to a data structure or application, the subject of this invention, it is indicated that it is necessary to have available a management system for the above-mentioned memory area enabling to know which parts of it are free or used. Of course, such a system may consist of a system similar to that used for managing hard discs in microcomputers, this system being known under the name of File Allocation Table, or FAT.

Preferably, but without limits, the subdivision of the above-mentioned memory area into addressable blocks may be obtained in a particularly advantageous way using the implementation of a specific memory allocation process, which will now be described in a non limiting way in more details in connection with FIG. 2c.

As shown in FIG. 2c, it is indicated that the dynamic allocation process in elementary memory blocks to a data structure is implemented from at least one instruction of an elementary memory block allocation $BL_i$, an allocation marked A, with which, in the above-mentioned memory block, is associated a reference to the identification number of the data structure or application considered, and from at least one deletion instruction for an elementary memory block, an instruction corresponding to the E operation shown in FIG. 2c.

In particular, the allocation A, to allocate an elementary memory block, consists of attributing to the identification number reference associated with the elementary memory block considered the value of the identification number $ID\_A_j$.

Whereas in the memory allocation processes for previous onboard systems, the areas for storing data structures, such as applications, have a simple reference with the identification number of the corresponding data structure or application made in the form of a pointer, pointer for the beginning of data structure or application storage and pointer for the end of data structure or application considered storage, the allocation step A complying with the above mentioned allocation process consists of actually giving, as a reference for the identification number of the data structure or application, the value of the above mentioned identification number to each $BL_i$ block where the digital information packs of the object code or data are stored. It is understood, in particular, as shown in FIG. 2c, that the attribution of the identification number value to the reference of the identification number consists of associating in a biunique manner the value of this identification number with the corresponding elementary memory block $BL_i$, such operation being marked:

$BL_i(ID\ A_j)$

It is thus understood that the biunique above-mentioned putting into correspondence may be achieved by an association to each $BL_i$ block of a data field representing the value of the above mentioned identification number ID $A_i$ in a management table of the memory dynamic allocation of the memory area for the above mentioned onboard system.

The complete structure of the above mentioned table will be given later in the description.

According to another noticeable feature in the above mentioned process of memory dynamic allocation in elementary memory blocks, one indicates, by referring to FIG. 2b, that the deletion step E consists, so as to remove an elementary memory block, of attributing to the reference to the identification number associated with the elementary memory block considered $BL_i$ an arbitrary value instead of the identification number of the data structure or application considered. This arbitrary value is of course the value AAAA previously mentioned in the description. This arbitrary value is different from any value of identification number attributed to a considered data structure.

If referring to FIG. 2c, on sees:

$[ID\_A_r]_{r=1}^n$ the whole of identification numbers for data structures already installed;

$ID\_A_k$ the identification number of the data structure or application for which the memory allocation has to be executed, $k \in [1,n]$;

$Q_k$ the necessary memory range for the digital information packs, object code packs or data packs to which a corresponding memory range should be allocated.

Also, a particular index r is defined, marked $r_0$, with a 0 value.

In such conditions, the A allocation operation, as shown in FIG. 2c, may consist, so as to allocate a given elementary memory block, marked $BL_i$, to the digital information pack $Q_k$ previously mentioned, and prior to any step consisting of attributing to the identification number reference the identification number value, to check, for any elementary memory block already allocated, the identity of the reference to the identification number and of the identification number of the related data structure, in one step $AA_1$. Such identity checking consists of executing a test consisting of looking for the first memory block $BL_i$ for which the associated identification number $ID\_A_r$ corresponds to the identification number ID_A of the data structure or application for which the allocation has to be made.

The above mentioned test is marked:

$\exists BL_i(ID\ A_r)$ with $ID\ A_r = ID\ A_k$ ?

and $r > r_0$

If there is a negative reply to the test AA1, consisting of looking for the next block belonging to the application for which the identification number is $ID\ A_k$, an instruction to allocate a block of free elementary memory block is called at the step AA3, none of the possible memory blocks already allocated to the application for which the identification number is $ID\_A_k$ having any free range sufficient to contain the information pack $Q_k$.

In FIG. 2c, the call for instruction of the next elementary memory block allocation is marked:

$BL_a(AAAA) = BL_a(ID\_A_k)$.

The allocation instruction above mentioned of the next elementary block thus enables the allocation of an elementary memory block of address a, a being any offset value, a $\in$ N, whole of the natural integral numbers. The elementary memory block taken is of course an elementary block to which has been previously attributed the arbitrary value AAAA and it so corresponds to a removed block, i.e., a free block ready for any allocation and storage of the corresponding information pack $Q_k$.

The positive response to the $AA_1$, test shows that the elementary memory block just found is at least partially allocated to the data structure or application for which the allocation has to be made.

If there is a positive response to the $AA_1$, previously mentioned test, the allocation process consists then of checking, with a test $AA_2$, the existence of a sufficient memory range remaining in the current elementary memory block $BL_i(ID\_A_r)$ previously mentioned to save the digital information $Q_k$ previously mentioned.

In FIG. 2c, the checking of the existence of a sufficient memory range in the test $AA_2$ includes the putting to the r value of the particular index $r_0$ and is marked:

$LR_r = LB_r - LO_r$ and $Q_k \leq LR_r$ ?

a formula in which $LR_r$ designates the remaining memory range for the current elementary memory block, $LB_r$ designates the total memory range for each current elementary block, i.e. 256 bytes in the previously mentioned embodiment mode, and $LO_r$ is the memory range occupied in the current previously mentioned elementary memory block.

If there is a positive response to the checking test $AA_2$, the information pack $Q_k$ requiring a memory range smaller than the memory range of the current elementary memory block, to the information pack Qk may be allocated in a step AA4, the previously mentioned current elementary memory range $BL_i(ID\_A_r)$, with the digital information pack $Q_k$ being possibly saved in the free memory area of the current previously mentioned elementary memory block.

Thus, the allocation step $AA_4$ consists of a writing of the information pack $Q_k$ in the block $BL_i$ $(ID\_A_r)$ and an updating of the value of memory range occupied in the block, marked:

$LO_r = LO_r + Q_k$.

If there is a negative response to the checking test AA2, the current block $BL(ID\_A_{j0})$ having too little free range to contain the information pack Qk, it is necessary to return to step $AA_1$, in order to look for another block with an identification number as $ID\_A_k$ not having yet been analysed during this allocation.

Of course, the allocation steps themselves $AA_3$ and $AA_4$ are followed by a return to the starting status S.

In a preferred implementation without limits, it is indicated that, further to allocation steps $AA_3$ and $AA_4$, and therefore further to allocation of an elementary memory block to an application and of course to the saving by writing the digital information, i.e. the information pack $Q_k$ by writing this information in the elementary memory block allocated, the allocation process according to the subject of this invention may also consist of calculating, in a step $AA_5$ a checksum of the allocated elementary memory block, this operation being designated by calculation CKS in FIG. 2c.

Generally, it is indicated that, for implementing the step $AA_5$, calculating the checksum may be made using calculation means of a classical checking value, these calculation means being also able to correspond to the specialised calculation circuit 20 contained in the onboard systems of the classical type, as described previously in the description.

The step $AA_5$ may enable calling a step $AA_6$ of classical type error management enabling to point out a problem of data integrity or saved code, allowing to provide a blockage of the onboard system.

The memory dynamic allocation process previously described in connection with FIG. 2c may be implemented in a preferred manner in order to proceed with the allocation steps $A_1$ and/or $A_2$ in FIG. 2a or 2b.

By implementing the optimised management method of the dynamic memory allocation to a data structure or application, according to the subject of this invention, such as previously described, in relation with FIG. 2a and eventually 2c, it is indicated that the fact of storing object code packs and data packs relating to an application or a structure of data, at different places enables to avoid breaking up of the memory area when installing applications. This is because, during the installation itself, there is no really breaking up or fragmentation phenomenon for code data packs, since the corresponding code packs are stored and saved in consecutive large blocks, and this in a single time during installation.

Regarding the risk of breaking up or fragmentation of data packs, since a data structure, such as an application can create data relating to this application or this data structure at any time and much more frequently, this is however much easier to control since the data blocks don't have to be stored consecutively. It is therefore very easy to use again a free elementary memory block by saving in it data packs relating to an application. The separation of data packs from code packs therefore solves properly the problem of breaking up or fragmentation.

However there are still holes, i.e. risks of elementary memory blocks that are not occupied in the first memory range dedicated to the allocation of object code pack memory in the considered memory area. This risk occurs when removing an application for instance.

To eliminate completely such risk, the optimised management method of the dynamic memory allocation to a data structure, as per the subject of this invention, also implement a defragmenting process, which will be described in relation with FIGS. 3a et 3b.

It is understood that further to deinstalling an application, such deinstalling is shown with a deletion of elementary memory blocks allocated to this application deinstalled in the first memory range dedicated to the object code packs memory allocation.

Figure 3A:
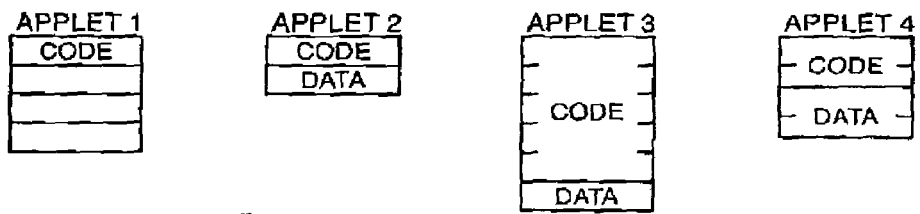
FIGS. 3a and 3b show, for illustration, a preferred implementation mode that is not limited for the memory allocation implementation of an onboard system, the subject of this invention, in which a process of new allocation of already allocated elementary memory blocks is used.

In FIG. 3a, there are various applications, successively called Applet 1, Applet 2, Applet 3 and Applet 4.

The various applications in the given example correspond to digital values as hereafter:

| | |
|---|---|
| Applet 1 | 150 bytes of code, i.e. 1 block |
| | 600 bytes de data, i.e. 3 blocks |
| Applet 2 | 150 bytes of code, i.e. 1 block |
| | 150 bytes of data, i.e. 1 block |
| Applet 3 | 1100 bytes of code, i.e. 5 blocks |
| | 200 bytes of data, i.e. 1 block |
| Applet 4 | 400 bytes of code, i.e. 2 blocks |
| | 300 bytes of data, i.e. 2 blocks |

Figure 3B:
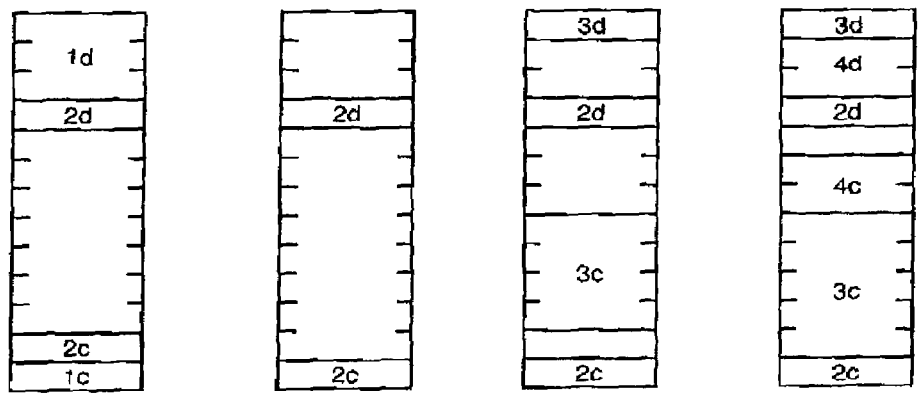

The successive installation/deinstalling steps of the above applications are shown in FIG. 3b and are as follows:

Step 1

Installation of Applet 1 and installation of Applet 2.

Step 2

Deletion of Applet 1 and reallocation of object code packs remaining not deinstalled.

Step 3

Installation of Applet 3.

Step 4

Installation of Applet 4.

In FIG. 3b, the memory range that can be used is said to be subdivided into a set of elementary memory blocks, with an address between 1 and L, of starting address, and respectively ending.

References 1c, 2c, 3c and 4c designate the elementary memory blocks allocated to object code packs for applications Applet 1, Applet 2, Applet 3 and Applet 4 respectively and the elementary memory blocks 1d, 2d, 3d and 4d designate the elementary memory blocks allocated to data packs relating to these applications.

The reallocation to the remaining object code pack, i.e. the pack 2c further to deletion of application Applet 1 at step 2, with the Applet 2 application not being deinstalled, consists in fact of reallocating by rearranging the elementary memory blocks allocated to the remaining object code pack previously mentioned. Thus, the rearranging of the elementary memory block occupied by the object code 2c in FIG. 3b is shown by the relocation T of this for passing to the elementary memory block with a starting address 1 at the end of step 2.

Thus, the above mentioned reallocating by rearranging, in particular by translation, allows for the rearranging of any set of elementary memory blocks that is situated at addresses almost close by to fill in the elementary memory blocks removed, previously allocated to the deinstalled application.

Generally speaking, as shown in FIG. 3b, the memory area of the onboard system, a non volatile programmable memory area, is preferably addressed according to a linear address field with a starting address and a memory area end address, such addresses being each a limit address. These addresses are marked 1 and L in FIG. 3b.

In such conditions, the definition of the dedicated first and respectively second memory range and the allocation of data packs may be made from one or the other limit addresses, or vice-versa. It is of course understood that the selection of the starting 1 address, respectively of the end L address to ensure the allocation of elementary memory blocks to the object code packs has no effect on the implementation of the process, the subject of this invention.

It is also understood that, depending on the number of applications installed, the clear definition of the first and second memory ranges dedicated to allocating object code memory packs or data packs is not necessary.

In particular, this operating mode allows the optimisation of the above mentioned memory area occupation if there is no clear definition of the dedicated first and second memory ranges.

In order to ensure a specially easy reallocation process of elementary memory blocks, it is indicated that the addressing of elementary memory blocks content, for allocation, reallocation and addressing for defining the first and second memory ranges, is a relative addressing. In such conditions, the relative addressing, in each elementary memory clock, allows easily to rearrange the above mentioned blocks by relocating a desired number of elementary memory blocks freed further to declaring the previous and/or subsequent elementary blocks as free or removed blocks.

The allocation of elementary memory blocks starting from limit addresses, as previously mentioned in the description, allows the use of free memory area in the best way if there is no fixing regarding the size of code and data relating to applications. The only constraint to comply with is the absence of cover of the first, respectively second dedicated memory range.

A more detailed description of an onboard system with several applications especially adapted to implementing the optimised management method for memory allocation to a data structure, as per the subject of this invention, will now be given in connection with FIG. 4.

Generally speaking, it is recalled that the above mentioned onboard system has an operating system ensuring the management of input/output circuits of the random access memory and non-volatile programmable memory for this operating system through the microprocessor.

Figure 4:
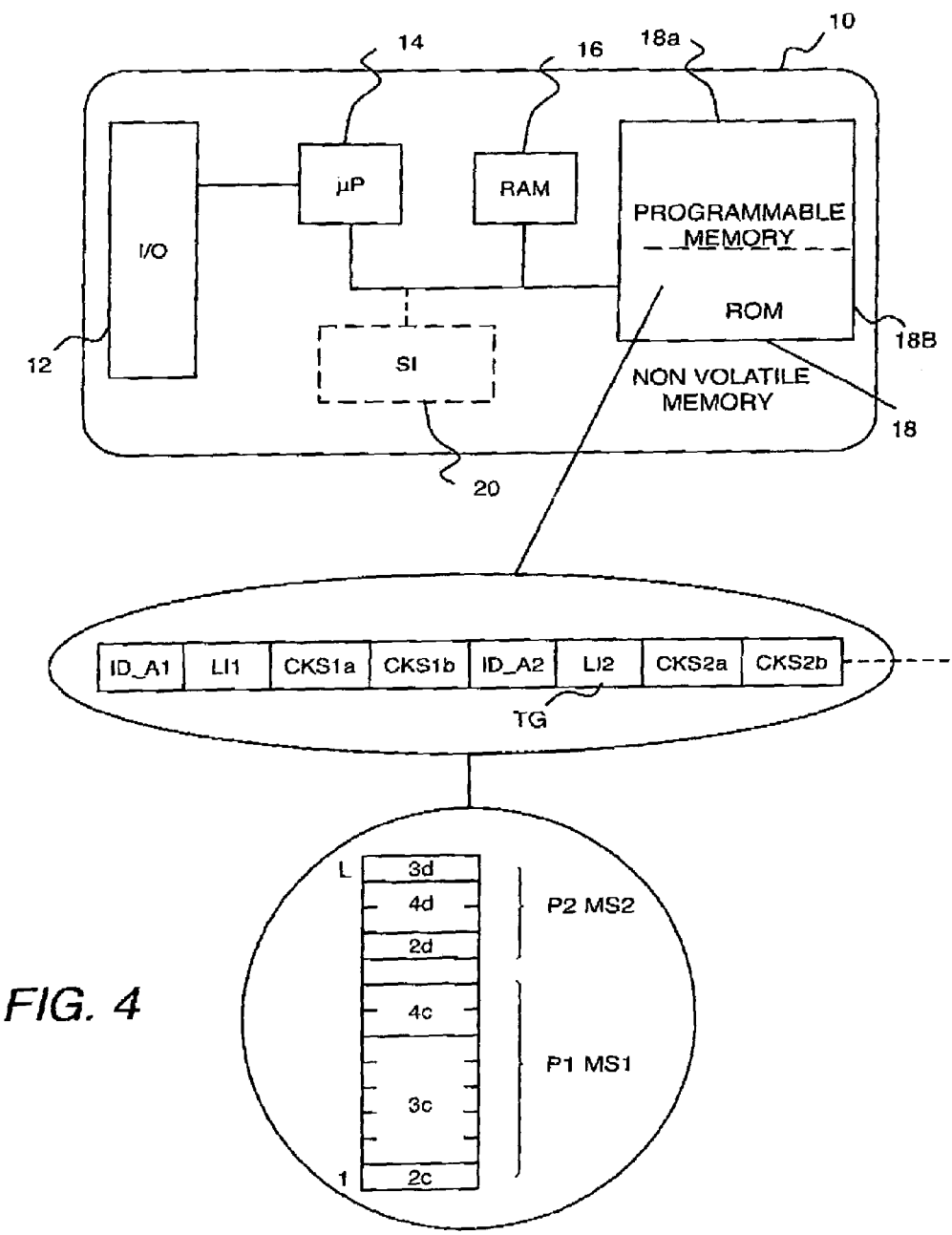
FIG. 4 shows, for illustration, an onboard system, such as a microprocessor or micro-controller card with several applications, having, stored in a non-volatile memory, data structures to which elementary memory blocks have been allocated, using the optimised management method implementation for memory allocation of an onboard system, the subject of this invention.

As shown on the above mentioned FIG. 4, the onboard system includes, in the non-volatile programmable memory area 18a, a management table, marked TG, and an allocation table for the memory area in elementary memory blocks.

As mentioned previously, this management table TG may be a file of the FAT type, or, on the contrary, as shown on FIG. 4 in a non limiting way, a table having for each application or data structure, an identification number $ID\_A_k$, the value of the occupied memory space marked $LI_k$ for the corresponding elementary memory block and the checking values $CKS_{1a}$ and $CKS_{1b}$ for the previously mentioned elementary memory block.

In FIG. 4, there are shown only the data fields that correspond for k=1 and k=2, i.e. for blocks related to two different applications.

In particular, the above-mentioned management table TG allows to ensure the allocation process such as shown in FIG. 2c and also of course the optimised management method for the dynamic allocation of memory as per the subject of this invention.

In such conditions, the programmable non-volatile memory 18a may include, as an example, the elementary memory blocks allocated to object code, respectively to data packs, according to the arrangement shown in FIG. 4 for applications Applet 3, Applet 2 and Applet 4 previously mentioned in the description further to executing step 4 of FIG. 3b.

In such conditions, the non-volatile programmable memory 18a includes object code packs covering a set of applications, these object code packs being saved in a set of elementary memory blocks situated at addresses very close to the first memory range $P_1$ as well as data packs related to each application, such data packs being saved in another set of elementary memory blocks in a second memory range $P_2$ dedicated to data packs memory allocation.

Referring to FIG. 4, it is also noted that, for a non-volatile programmable memory area addressed according to a linear addresses field comprising a starting address 1 and an ending address L, which in fact make up the limit addresses as above-mentioned, the definition of the first $MS_1$ and the second $MS_2$ ranges of dedicated memory is then made starting from the above mentioned limit addresses, the first and second dedicated memory ranges $MS_1$, $MS_2$ being then defined according to a first and second separate elementary memory block sets, the memory area being so optimised regarding its occupation.

The invention claimed is:

1. An optimized management method for dynamic memory allocation to one or several data structures ($ID_{13}Aj$), saved in the form of digital information packs in the memory area of an onboard system, wherein said information packs are made of object code packs (QCOj), representing these data structures, and of data packs (QDj) relating to these data structures and said memory area is subdivided in addressable elementary memory blocks ($BL_i$), the method consisting of allocating (A) a set of elementary memory blocks to said code and data packs and for a deletion operation (E), of rearranging, only for code packs (QCOj), the allocated elementary blocks.

2. The method according to claim 1, wherein, for a deletion operation ($E_1$, $E_2$), the rearrangement of blocks consists of reallocating by translation to said remaining object code packs, a set of elementary memory blocks to fill in the deleted elementary memory blocks.

3. The method according to one of the claims 1 or 2, wherein:
   allocating to said object code packs (QCOj) a set of elementary memory blocks situated at addresses mainly closed in a first memory range (MS1) dedicated to allocating a memory of object code packs of said memory area;
   allocating to said data packs (QDj) another set of elementary memory packs in a second memory range dedicated to allocating a memory of data packs of the said memory area.

4. The method according to claim 3, wherein, for a memory area addressed according to a linear address field having a starting address and an ending address for the memory area each constituting a limit address, the definition of the dedicated first (MS1) respectively second (MS2) memory range and the allocation of object code packs (QCOj), respectively of data packs (QDj) are executed starting from one or respectively the other limit address, or vice-versa, which allows optimising the occupation of said memory area.

5. The method according to claim 1, wherein the content addressing for said elementary memory blocks for allocation and reallocation operations intended at least for object code packs and addressing to define the first and the second memory range is a relative addressing.

6. An onboard system comprising a dynamically allocated memory area to one or several data structures (ID-Aj) saved in the form of digital information packs, wherein said information packs are made of object code packs (QCOj) representing these data structures, and of data packs (QDj) relating to these data structures and in that said memory area is subdivided into addressable elementary memory blocks ($BL_i$) allocated to said code and data packs and rearranged for deleting, only for code packs (QCOj).

7. An onboard system according to claim 6, wherein:
   the object code packs (QCOj) are saved in a set of localized elementary memory blocks, at addresses almost continuous in a first memory range $MS_1$ dedicated to memory allocation for object code packs, in said memory area;
   the data packs are saved in another set of elementary memory blocks in a second memory range ($MS_2$) dedicated to allocating memory to data packs, in said memory area.

8. A system according to claim 7, wherein for a memory area addressed according to a linear address field comprising a memory area starting address and an ending address, being each a limit address, the definition of the dedicated first and respectively the second memory range is made starting from one, or respectively the other limit addresses, or vice-versa, which enables a definition of the dedicated first and respectively the second memory range according to a first and second separate set of elementary memory blocks and to optimize the occupation of said memory area.

* * * * *